US011442729B2

(12) United States Patent
Ahn et al.

(10) Patent No.: US 11,442,729 B2
(45) Date of Patent: Sep. 13, 2022

(54) BIT-PACKED ARRAY PROCESSING USING SIMD

(71) Applicant: Google LLC, Mountain View, CA (US)

(72) Inventors: Junwhan Ahn, San Jose, CA (US); Jichuan Chang, San Jose, CA (US); Andrew McCormick, Mountain View, CA (US); Yuanwei Fang, Mountain View, CA (US); Yixin Luo, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 50 days.

(21) Appl. No.: 17/080,282

(22) Filed: Oct. 26, 2020

(65) Prior Publication Data

US 2022/0129269 A1 Apr. 28, 2022

(51) Int. Cl.

| | |
|---|---|
| ***G06F 9/30*** | (2018.01) |
| ***G06F 1/03*** | (2006.01) |
| ***G06F 9/38*** | (2018.01) |

(52) U.S. Cl.

CPC ............ *G06F 9/30036* (2013.01); *G06F 1/03* (2013.01); *G06F 9/30105* (2013.01); *G06F 9/3836* (2013.01); *G06F 9/3887* (2013.01)

(58) Field of Classification Search

CPC .... G06F 9/30036; G06F 1/03; G06F 9/30105; G06F 9/3836; G06F 9/3887; G06F 9/30018; G06F 9/30021; G06F 9/30032; G06F 9/30043; G06F 9/30109; G06F 9/3016

See application file for complete search history.

(56) References Cited

U.S. PATENT DOCUMENTS

| | | | |
|---|---|---|---|
| 7,219,214 | B2 | 5/2007 | Ford et al. |
| 9,557,994 | B2 | 1/2017 | Symes et al. |
| 2005/0132165 | A1 | 6/2005 | Ford et al. |

(Continued)

FOREIGN PATENT DOCUMENTS

| | | |
|---|---|---|
| EP | 3547117 A2 | 10/2019 |

OTHER PUBLICATIONS

Extended European Search Report for European Application No. 21171904.2 dated Nov. 5, 2021. 11 pages.

*Primary Examiner* — Farley Abad

(74) *Attorney, Agent, or Firm* — Lerner, David, Littenberg, Krumholz & Mentlik, LLP

(57) ABSTRACT

A method and system for processing a bit-packed array using one or more processors, including determining a data element size of the bit-packed array, determining a lane configuration of a single-instruction multiple-data (SIMD) unit for processing the bit-packed array based at least in part on the determined data element size, the lane configuration being determined from among a plurality of candidate lane configurations, each candidate lane configuration having a different number of vector register lanes and a corresponding bit capacity per vector register lane, configuring the SIMD unit according to the determined lane configuration, and loading one or more data elements into each vector register lane of the SIMD unit. SIMD instructions may be executed on the loaded one or more data elements of each vector register lane in parallel, and a result of the SIMD instruction may be stored in memory.

20 Claims, 6 Drawing Sheets

400

(56) References Cited

U.S. PATENT DOCUMENTS

| | | | | |
|---|---|---|---|---|
| 2015/0012724 | A1* | 1/2015 | Lutz | G06F 9/30032<br>712/22 |
| 2017/0286109 | A1* | 10/2017 | Jha | G06F 9/30018 |
| 2018/0189184 | A1* | 7/2018 | Zbiciak | G06F 12/0897 |
| 2019/0205132 | A1* | 7/2019 | Bui | G06F 9/3016 |

* cited by examiner 210 220

| Bits per data item | SIMD Vector Lanes |
|---|---|
| ⋮ | ⋮ |
| 20 bits | 2 64-bit lanes |
| 21 bits | 2 64-bit lanes |
| 22 bits | 4 32-bit lanes |
| 23 bits | 4 32-bit lanes |
| 24 bits | 4 32-bit lanes |
| ⋮ | ⋮ |

BIT-PACKED ARRAY PROCESSING USING SIMD

BACKGROUND

Densely packed arrays of numeric values are typically processed by loading the values into a CPU scalar register, decoding single values at a time using a shift and mask technique, and comparing the decided value with a target value. However, this approach suffers from slow processing times and expensive storage overhead. The bit-widths of the values in the densely packed array are often much smaller than a 32-bit or 64-bit CPU word, meaning that the register and datapath are underutilized.

One option to improve register and datapath utilization is to process multiple data elements or data items in parallel using a single-instruction multiple-data (SIMD) architecture. However, SIMD architectures are not necessarily efficient for processing values stored in a bit-packed array, which includes data elements that can have any number of bits. A SIMD unit uses multiple lanes that are limited to having fixed lane widths, and the fixed lane widths are not necessarily aligned with the number of bits included in the bit-packed array data elements. Misalignment of the data elements in the array vis-à-vis the SIMD lanes requires costly techniques, such as data shuffling, to restore alignment of the array data after processing.

BRIEF SUMMARY

The present disclosure avoids the need for restoring alignment of bit-packed array data elements by packing multiple data elements in each SIMD lane until another data element cannot fit in the lane, leaving a small amount of storage overhead. Storage overhead can be further reduced by providing a configurable lane alignment that varies according to data element size.

One aspect of the present disclosure is directed to a method for processing a bit-packed array, including determining, by one or more processors, a data element size of the bit-packed array, determining, by the one or more processors, a lane configuration of a single-instruction multiple-data (SIMD) unit for processing the bit-packed array based at least in part on the determined data element size, the lane configuration being determined from among a plurality of candidate lane configurations, each candidate lane configuration having a different number of vector register lanes and a corresponding bit capacity per vector register lane, configuring, by one or more processors, the SIMD unit according to the determined lane configuration, and loading, by one or more processors, one or more data elements into each vector register lane of the SIMD unit.

In some examples, the plurality of candidate lane configurations may include one or more of a 16-bit lane width, a 32-bit lane width, a 64-bit lane width, and a 128-bit lane width.

In some examples, the lane configuration of the SIMD unit may be determined according to a lookup table correlating given data element sizes with corresponding lane configurations.

In some examples, loading one or more data elements into each vector register lane may be repeated until the determined data element size exceed a remaining space of each vector register lane.

In some examples, loading one or more data elements into each vector register lane may include loading the data elements into each vector register lane in an interleaving pattern according to a predetermined lane order.

In some examples, the method may further include executing, by one or more processors, a SIMD instruction on the loaded one or more data elements of each vector register lane in parallel, and storing, by one or more processors, a result of the SIMD instruction in memory.

In some examples, executing a SIMD instruction on a loaded data element of each vector register lane in parallel may include performing one or more mask and shift operations, whereby the SIMD instruction is executed on only a single data element of each vector register lane in parallel per mask and shift operation.

In some examples, a result of the SIMD instruction on the bit-packed array may be stored in an order corresponding to the predetermined lane order.

In some examples, executing a SIMD instruction may include executing at least one of: (a) one or more compare/decode instructions or (b) one or more filter instructions.

In some examples, executing a SIMD instruction may include executing an instruction of an AVX, AVX2, AVX-512, SSE, or ARM Neon instruction set.

Another aspect of the disclosure is directed to a system for processing a bit-packed array, including memory for storing instructions and one or more processors coupled to the memory and configured to execute the stored instructions to determine a data element size of the bit-packed array, determine a lane configuration of a single-instruction multiple-data (SIMD) unit for processing the bit-packed array based at least in part on the determined data element size, the lane configuration being determined from among a plurality of candidate lane configurations, each candidate lane configuration having a different number of vector register lanes and a corresponding bit capacity per vector register lane, configure the SIMD unit according to the determined lane configuration; and load one or more data elements into each vector register lane of the SIMD unit.

In some examples, the plurality of candidate lane configurations may include one or more of a 16-bit lane width, a 32-bit lane width, a 64-bit lane width, and a 128-bit lane width.

In some examples, the one or more processors may be configured to determine the lane configuration of the SIMD unit according to a lookup table correlating given data element sizes with corresponding lane configurations.

In some examples, the one or more processors may be configured to repeatedly load one or more data elements into each vector register lane until the determined data element size exceed a remaining space of each vector register lane.

In some examples, the one or more processors may be configured to load the data elements into each vector register lane in an interleaving pattern according to a predetermined lane order.

In some examples, the one or more processors may be configured to execute a SIMD instruction on the loaded one or more data elements of each vector register lane in parallel, and store a result of the SIMD instruction in memory.

In some examples, the one or more processors may be configured to perform one or more mask and shift operations, whereby the SIMD instruction is executed on only a single data element of each vector register lane in parallel per mask and shift operation.

In some examples, the one or more processors may be configured to store a result of the SIMD instruction on the bit-packed array in an order corresponding to the predetermined lane order.

In some examples, the SIMD instruction may be at least one of: (a) one or more compare/decode instructions or (b) one or more filter instructions.

In some examples, the SIMD instruction may be an instruction of an AVX, AVX2, AVX-512, SSE, or ARM Neon instruction set.

BRIEF DESCRIPTION OF THE DRAWINGS

FIG. 2 is a graphical representation of an example data table according to aspects of the disclosure.

DETAILED DESCRIPTION

Overview

Figure 1:
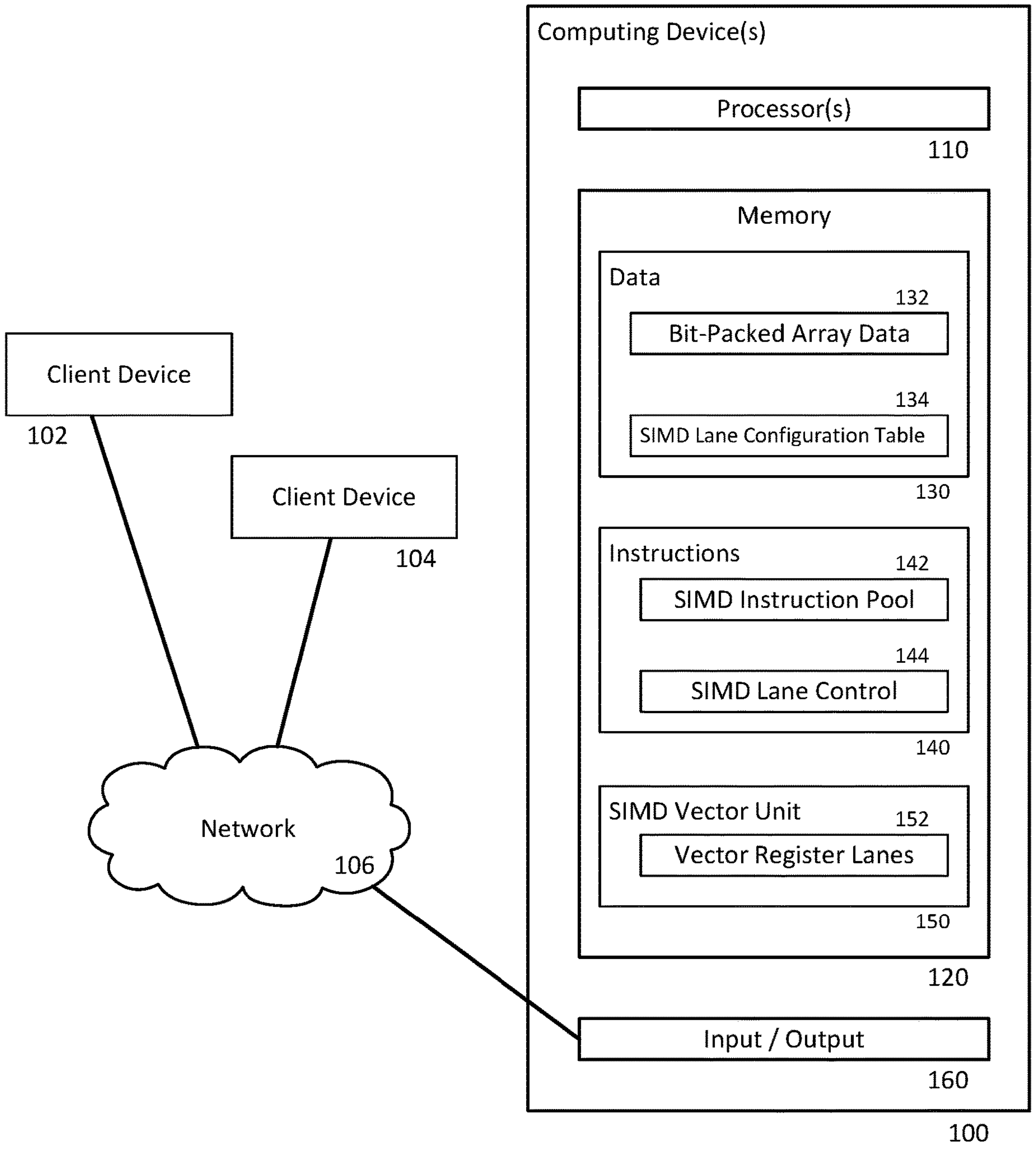
FIG. 1 is a block diagram of an example system according to aspects of the disclosure.

The technology of the present disclosure relates generally to a system for scanning and computing bit-packed array data, and particularly scanning and computing bit-packed array data using a single-instruction multiple-data (SIMD) architecture. Multiple data elements are packed into each SIMD lane until another data element cannot fit in the lane, leaving a small amount of storage overhead.

Storage overhead can be further reduced by providing a configurable lane alignment that varies according to data element size. For example, in a configurable SIMD architecture supporting both 2 64-bit lanes or 4 32-bit lanes, selecting the lane configuration may depend on a tradeoff between the number of lanes provided and how efficiently the data elements may be packed into each lane. Configurations for a given data element size may be determined based on one or more pre-stored functions, such as a look-up table.

For example, scanning and computing a bit-packed array having 15 bits per data element may be accomplished by setting the lane width to 32 bits and packing 2 data elements into each lane, leaving a storage overhead of about 2 bits per data element in each 32-bit vector register. For further example, the same architecture may scan and compute a bit-packed array having 17 bits per data element by setting the lane width to 64 bits and packing 3 data elements into each lane, leaving a storage overhead of 13 bits in each 64-bit vector register.

The above approach strikes a tradeoff between, and an overall improvement to, datapath utilization, storage overhead and processing cost, since the datapaths and storage registers are mostly utilized and the processed data remains in alignment without requiring expensive realignment procedures. Furthermore, the approach is compatible with modern CPUs, including Intel®, AMD®, and ARM CPUs, covers a wide range of query operations, and permits for outputting results in any desired amount of bits.

Example Systems

FIG. 1 illustrates an example system having one or more computing devices 100 for performing SIMD operations in accordance with the present disclosure. The computing devices 100 may be included in a distributed data processing system, such as one or more computing devices including in one or more datacenters. The computing devices 100 may be configured to run complex operations on large volumes of data. Such operations may be performed in response to queries. In some examples, the queries may be received by a client computing device 102, 104. In some examples, the queries may be necessitated in order to carry out other instructions or queries received from client computing devices or other computing devices.

The computing devices 100 may be capable of direct and indirect communication with one another, with client devices 102, 104, or any combination thereof, over a network 106. The network 106, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing. Such communication may be facilitated by a device capable of transmitting data to and from other computers, such as modems (e.g., dial-up, cable or fiber optic) and wireless interfaces.

The computing devices 100 may include one or more processors 110, servers, shards, cells, or the like. It should be understood that each computing device may include any number of processors or computing devices, and that the number of such devices in the computing devices 100 may vary over time, for example, as hardware is removed, replaced, upgraded, or expanded. The processor 110 can be a well-known processor or other lesser-known types of processors. Alternatively, the processor 110 can be a dedicated controller such as an ASIC.

The computing devices 100 may also include memory 120, and other components typically present in general purpose computers. The memory 120 can store information accessible by the processor 110, including data 130 that can be retrieved, manipulated or stored by the processor 110. The memory 120 can also include instructions 140 that can be executed by the processor 110. The memory 120 may be a type of non-transitory computer readable medium capable of storing information accessible by the processor 110, such as a hard-drive, solid state drive, tape drive, optical storage, memory card, ROM, RAM, DVD, CD-ROM, write-capable, and read-only memories.

The memory 120 can also include a SIMD vector unit 150 for organizing and storing data elements of the data 130 during the processing directed by the instructions 140. In particular, the SIMD vector unit 150 may be structured so that a single instruction can be executed in parallel on multiple data elements contained in the registers of the vector unit 150.

The data 130 may include a bit-packed array 132 including separate data elements, the individual data elements having a certain bit length. The values may be stored according to a columnar-store database management system (DBMS), whereby each individual column may be stored in an encoding that is tailored to fit the particular data being encoded. Specialized encoding may include applying any one or combination of dictionary encodings, run-length encodings, and so on, as appropriate. The use of bit-packed arrays within such encodings allows for the representation of data in the range [0, 2^N−1] using N bits per entry. Using N bits, as opposed to a full representation of 32 or 64 bits, reduces overall storage cost.

The data 130 may also include a lane configuration table 134 mapping different lane configurations for SIMD operations based on the number of N bits per data element in the bit-packed array being processed. FIG. 2 shows an example lane configuration table 200, in which each value of a first column 210 indicating the number of bits per data element in the bit-packed array is associated with a corresponding value in a second column 220 indicating the lane configuration for SIMD operations. In can be seen in the example of FIG. 2 that the number of vector register lanes in the SIMD unit 150, as well as the width of each vector register lane, may vary as the size of the data elements in the bit-packed array changes, such that bit-packed array values of different bit lengths may be processed differently. The example values shown in columns 210 and 220 of table 200 are discussed in greater detail in connection with FIGS. 3A and 3B.

The instructions 140 may include a SIMD instruction pool including one or more SIMD instructions 142 that may be executed on the data elements 132 stored in the SIMD vector unit 150. Examples of SIMD instructions include, but are not limited to, compare instructions, decode instructions, and filter instructions. The instructions 240 may further include a SIMD lane control instruction 144 for controlling a lane configuration of the SIMD unit 150. The SIMD lane control instruction 144 may be executed in accordance with data from the bit-packed array 132, such as a bit-length of data elements in the bit-packed array, and the SIMD lane configuration table 134.

The SIMD vector unit 150 may include a variably configuration arrangement of vector register lanes 152. For example, a SIMD vector unit having a 128-bit vector register may be maintained as a single 128-bit lane, divided into two 64-bit lanes, divided into four 32-bit lanes, divided into eight 16-bit lanes, and so on. Increasing the number of lanes increases throughput since each lane can execute a single SIMD instruction in parallel. However, smaller lanes may not be large enough to hold some large bit-packed array data elements, such as a 16-bit lane holding a 20-bit data element.

Figure 3A:
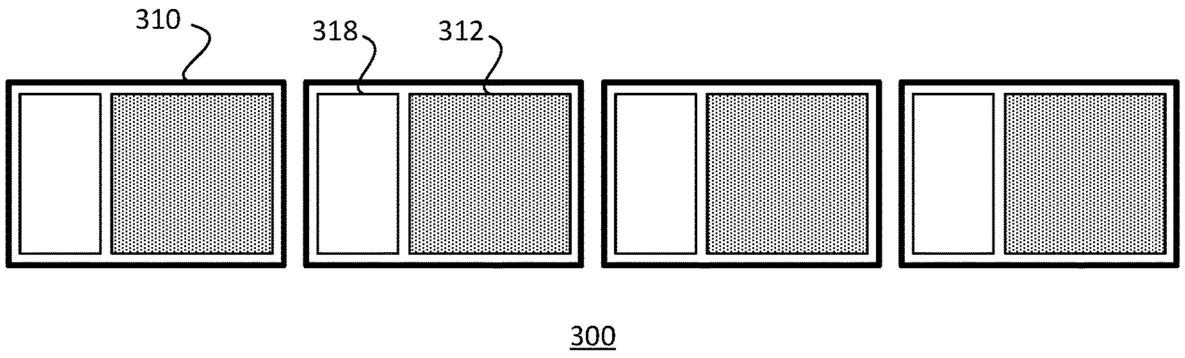
FIGS. 3A and 3B are block diagrams of example lane configurations of a SIMD vector unit according to aspects of the disclosure.
Figure 3B:
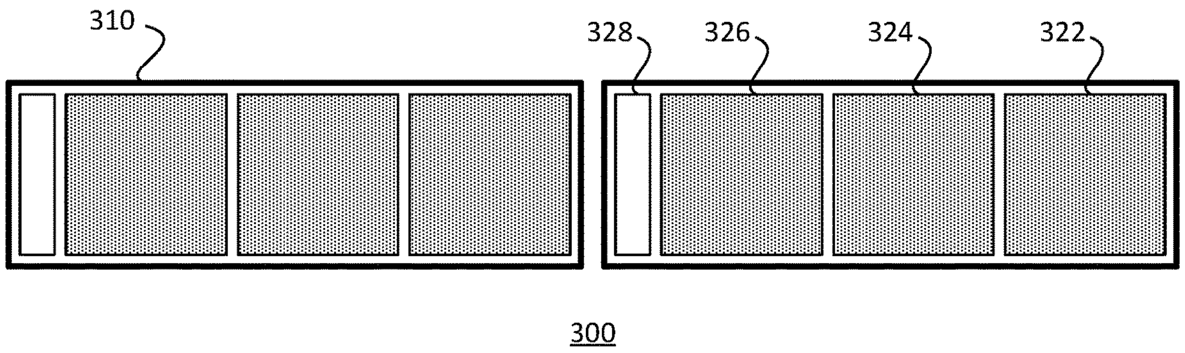

Additionally, some lane configurations may have high storage overhead. In some cases, storage overhead may be reduced by increasing lane width and packing multiple data elements into a single lane. FIGS. 3A and 3B illustrate an example of how storage overhead may be reduced by widening vector register lane width. In each of FIGS. 3A and 3B a SIMD vector unit 300 includes a 128-bit vector register. In FIG. 3A, the vector register is divided into four 32-bit lanes 310. In FIG. 3B, vector register is widened so as to be divided into two 64-bit lanes 320.

Both examples of FIGS. 3A and 3B illustrate loading bit-packed array data elements having a bit length of 20 bits. In the example of FIG. 3A, each lane has a width of 32 bits, meaning that each lane has space for only a single 20-bit data element. This leaves 12 bits of unused space in each lane, resulting in an overall storage overhead of 48 bits among the four lanes. By comparison, in the example of FIG. 3B, each lane has a width of 64 bits, meaning that each lane has space for three 20 bit-data elements. This leaves 4 bits of unused space in each lane, resulting in an overall storage overhead of 8 bits between two lanes.

There is a tradeoff between the reduces throughput of the lane configuration of FIG. 3B compared to FIG. 3A. In some example arrangements prioritizing high throughput, it may be desired to maintain high throughput at the expense of storage overhead. Conversely, in other example arrangements that may not prioritize throughput, the tradeoff of lower throughput in return for lower storage overhead may be advantageous.

For a given arrangement, the lane configurations for respective data elements of different bit lengths may be determined in advance. The determinations may be stored in memory, such as in the form of a SIMD lane configuration table 134 as shown in FIG. 1. In the example of FIG. 2, a portion of such a table 200 is shown. In that example, the table 200 indicates that for data elements having a bit length of 20 bits being processed in a 128-bit SIMD vector unit, such as in the examples of FIGS. 3A and 3B, the 128-bit SIMD vector unit is configured to have two 64-bit lanes. This permits for reduced storage overhead.

As can be seen from FIG. 2, the table 200 may indicate may be set to configure the SIMD vector unit to have two lanes unless the two-lane configuration does not provide a storage overhead advantage. For data elements having a bit length of 21 bits, three data elements can be packed into each 64-lane with an overall storage overhead of 2 bits (as compared to an overall storage overhead of 44 bits for the four lane configuration). But for data elements having a bit length of 22 or more bits, only two data elements can be packed into each 64-bit lane, resulting in the same overall data storage overhead. That is, packing 22-bit data elements into the SIMD vector unit leaves a storage overhead of 40 bits regardless of whether the unit is configured to have two or four lanes. Similarly, packing 23-bit data elements into the SIMD vector unit leaves a storage overhead of 36 bits regardless of whether the unit is configured to have two or four lanes, and packing 24-bit data elements into the SIMD vector unit leaves a storage overhead of 32 bits regardless of whether the unit is configured to have two or four lanes. Thus, for these configurations, there is no gain in storage overhead with a loss in throughput, and the table 200 indicates setting the SIMD vector unit to the configuration having four 32-bit lanes.

The examples shown in FIG. 2 are non-exhaustive, and it should be understood that other systems may include different predetermined correspondences between data element sizes and SIMD lane configurations. Taking a 128-bit SIMD unit again for example, for data elements having a size of 25 bits, four elements may be loaded into four lanes with overhead of 28 bits (seven bits per 32-bit lane), four elements may be loaded into two lanes with an overhead of 28 bits (fourteen bits per 64-bit lane), or five elements may be loaded into one 128-bit lane with overhead of 3 bits. Thus, a choice may be made between the 32-bit lane configuration that processes four elements at once, and the 128-bit lane configuration that significantly reduces storage overhead. In another example, for data elements having a size of 9 bits, eight elements may be loaded into eight lanes with overhead of 56 bits (seven bits per 16-bit lane), twelve elements may be loaded into four lanes with an overhead of 20 bits (five bits per 32-bit lane), or fourteen elements may be loaded into two lanes with overhead of 2 bits (one bit per 64-bit lane). Thus, a choice may be made between the 16-bit lane configuration that processes eight elements at once, the 64-bit lane configuration that significantly reduces storage overhead, or the 32-bit lane configuration that strikes a balance between processing and storage overhead considerations.

It should further be understood that a system may include multiple tables with different predetermined correspondences between data element sizes and SIMD lane configurations. Such systems may further include instructions or rules for selecting which table to use for processing data. In such as system, different tables may be utilized for different types of SIMD operations, depending on available processing, depending on available memory, or any combination thereof. For example, a first table may be designed to favor faster processing in order to save CPU cycles, and a second table may be designed to favor lower overhead in order to reduce memory usage and storage overheads. In such an example, the first table may be selected when performing expensive SIMD operations that require a lot of processing, whereas the second table may be selected when performing more lightweight operations or to store data.

Example Methods

Figure 4:
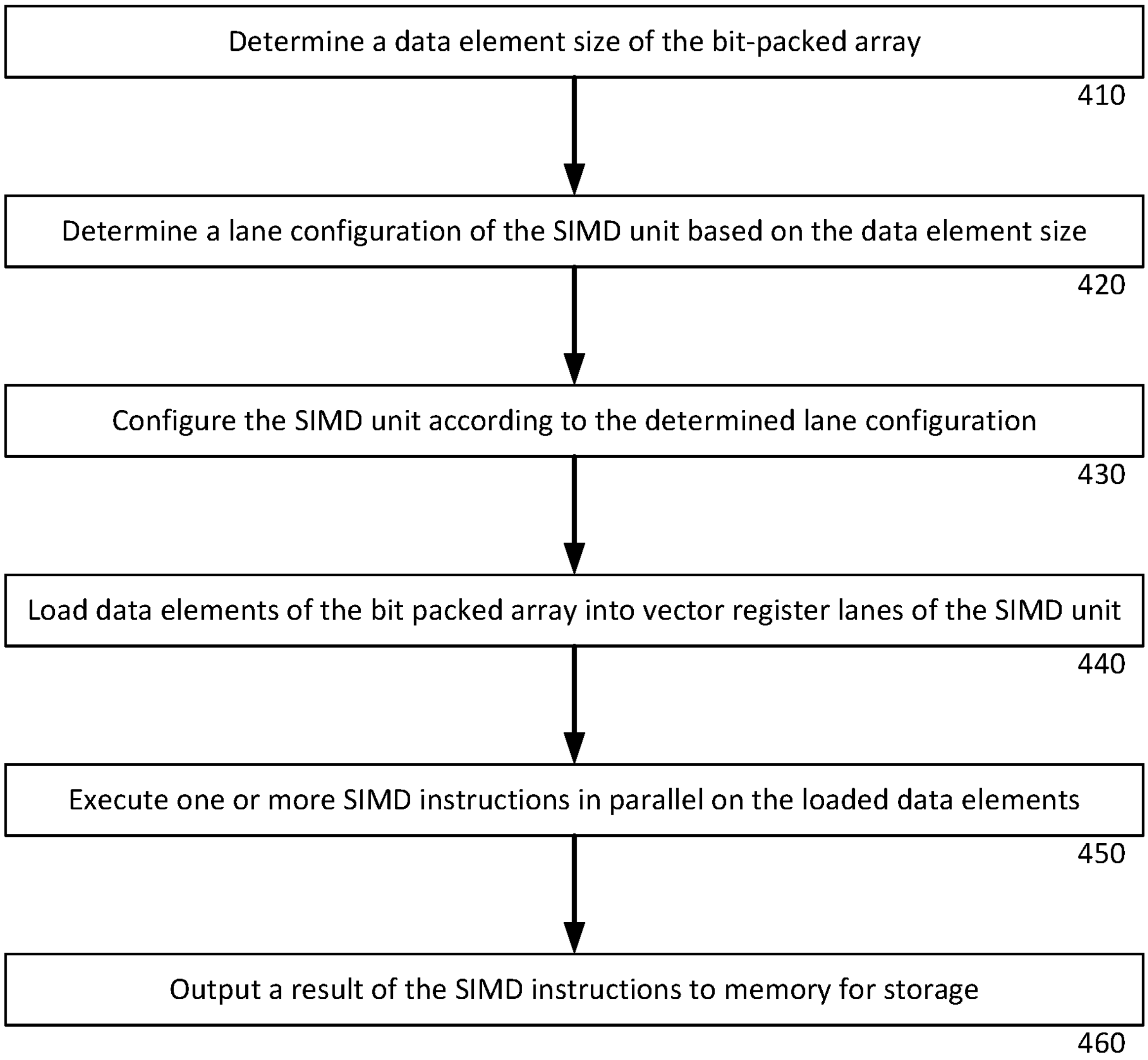
FIG. 4 is a flow diagram of an example bit-packed array processing routine according to aspects of the disclosure.

FIG. 4 is a flow diagram illustrating an example routine 400 for processing a bit-packed array using a SIMD unit. The routine 400 may be executed by one or more processors, such as the processors of the example system of FIG. 1. Certain aspects of the routine are illustrated in FIGS. 5A-5D. The illustrations provide an example of data elements having a size of 20 bits being loaded into a SIMD unit 500, being operated upon, and lastly being stored in a memory after the operation. The illustrations are referenced herein in connection with the routine 400.

At block 410, the processor determines a data element size of the bit-packed array. Due to the nature of the bit-packed array, the data element size is not limited to values of $2^n$ for an integer n. Instead, the data element size may be any length of bits.

At block 420, the processor determines a lane configuration of the SIMD unit based on the data element size. The lane configuration may be determined based on prestored information that indicates certain data element sizes corresponding to respective lane configurations. In the example system of FIGS. 1 and 2, the prestored information is in the form of a table mapping different data element sizes to corresponding lane configurations. The correspondences indicated in the prestored information may be chosen to balance high parallelism with as many vector register lanes as possible with low storage overhead by selecting a lane configuration into which data elements can be packed without excessive space being left in the register.

At block 430, the processor configures the SIMD unit according to the determined lane configuration. A SIMD unit may be capable of being restructured and reconfigured to different lane configurations. For example, a 128-bit SIMD unit may be configured as a single 128-lane, two 64-bit lanes, four 32-bit lanes, eight 16-bit lanes, and so on. Similarly, a 256-bit SIMD unit may be configured as a single 256-lane, two 128-bit lanes, four 64-bit lanes, eight 32-bit lanes, and so on.

At block 440, the processor loads the data elements of the bit-packed array into the vector register lanes of the SIMD unit. Loading data elements may be loaded into a vector register lanes until each lane is full. A lane may be considered full when the size of the data element exceeds the remaining space of the vector register lane. For example, for loading 17-bit data elements into a 64-bit lane, three data elements may be loaded before a fourth 17-bit data element would exceed the remaining 13 bits of space in the lane. Additionally, in some examples, the data elements may be loaded into each lane in an interleaving pattern, whereby every lane is loaded with one data element according to a predefined lane order before another data element is loaded into any one of the lanes, the loading according to the lane order repeats until each of the lanes is full.

Figure 5A:
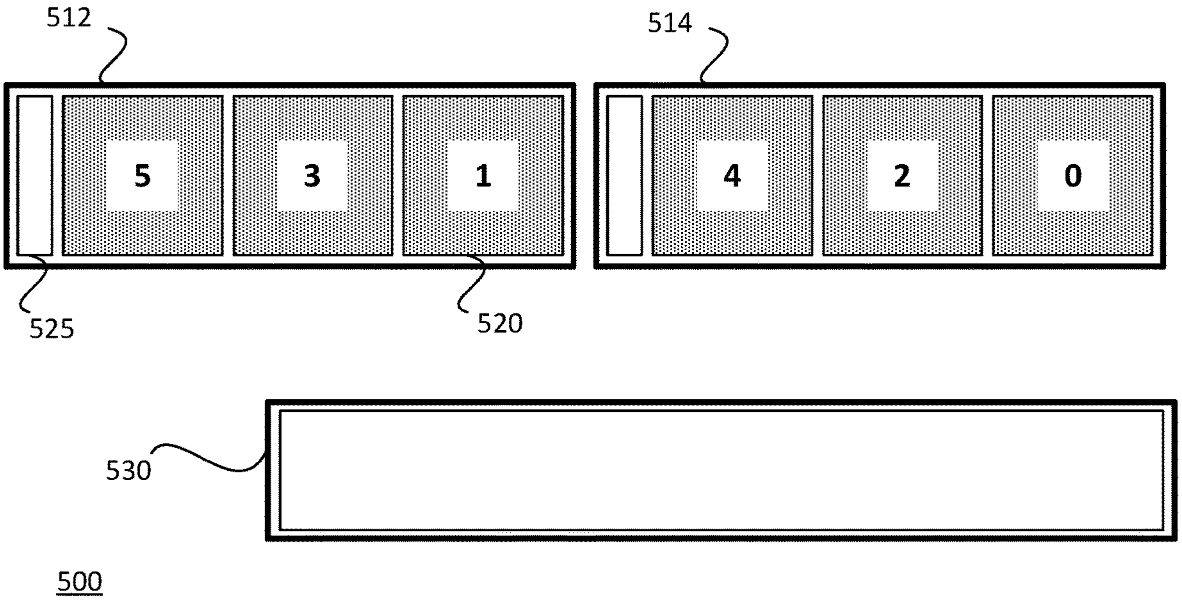
FIGS. 5A-5D are block diagrams illustrating execution of the example routine of FIG. 4.

An example loaded SIMD unit 500 is illustrated in FIG. 5A. In the example of FIG. 5A, the SIMD unit is configured to include two 64-bit lanes 512, 514. Data elements 520, numbered 0-5, are loaded into the SIMD unit 500 in an interleaving pattern according to a predetermined lane order, which requires loading a data element into lane 514 before loading an item into lane 512. Thus, the first data element 0 is loaded into lane 514, then 1 into lane 512, then 2 into lane 514, then 3 into lane 512, then 4 into lane 514, and finally 5 into lane 512. The end result is that each of lanes 512 and 514 are loaded with three data elements, each data element being 20-bits in length. Ultimately, six data elements are loaded into the SIMD unit 500, leaving a remaining four bits of storage overhead 525 in each lane.

At block 450, the processor executes one or more operations or SIMD instructions in parallel on the data elements loaded into the respective vector register lanes. The instructions may include any one or combination of instructions included in compare/decode operations or filter operations. The operations or instructions may be part of an instruction set, including but not limited to x86 SIMD instructions, the Advanced Vector Extensions (AVX) instruction set, the AVX2 instruction set, the AVX-512 instruction set, an SSE instruction set, or an ARM Neon instruction set.

Figure 5B:
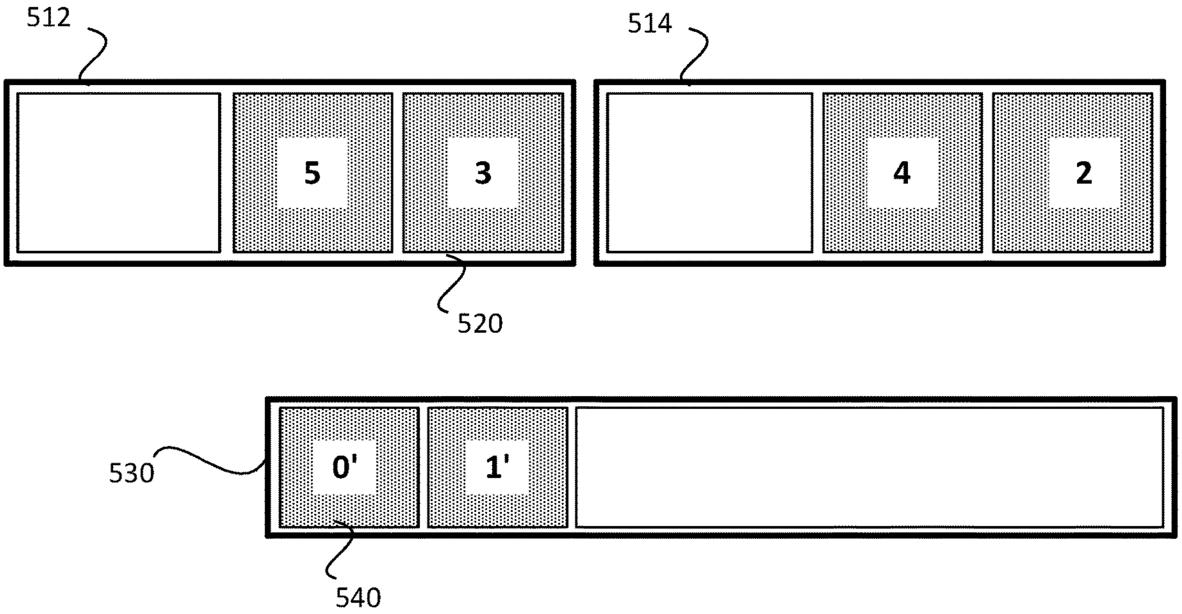
Figure 5C:
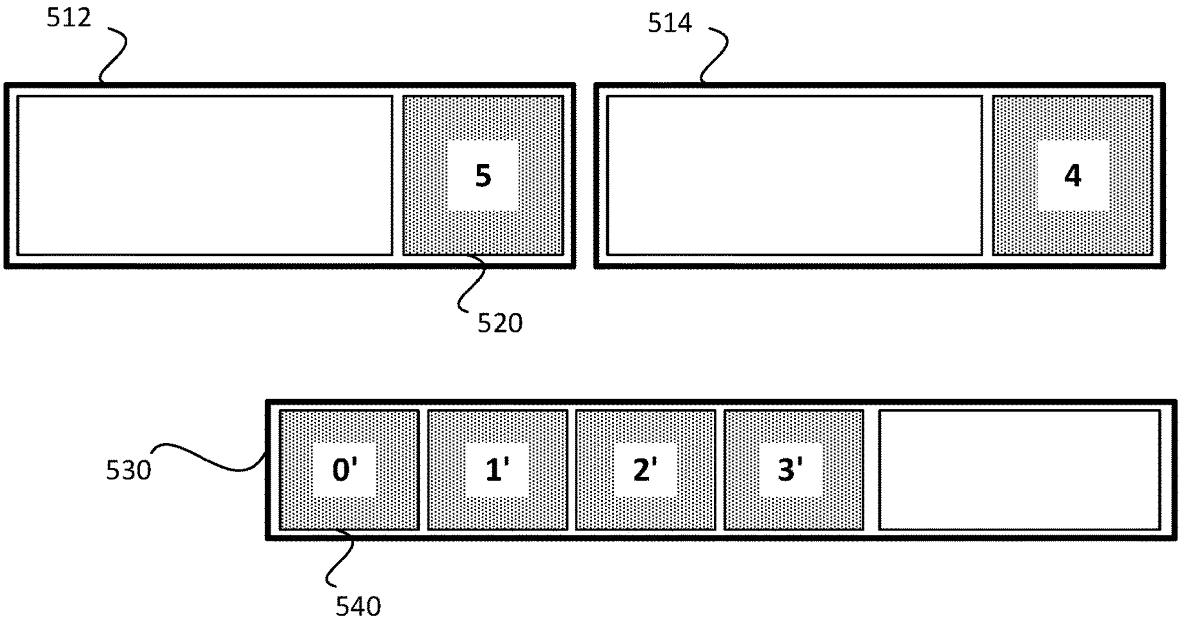
Figure 5D:
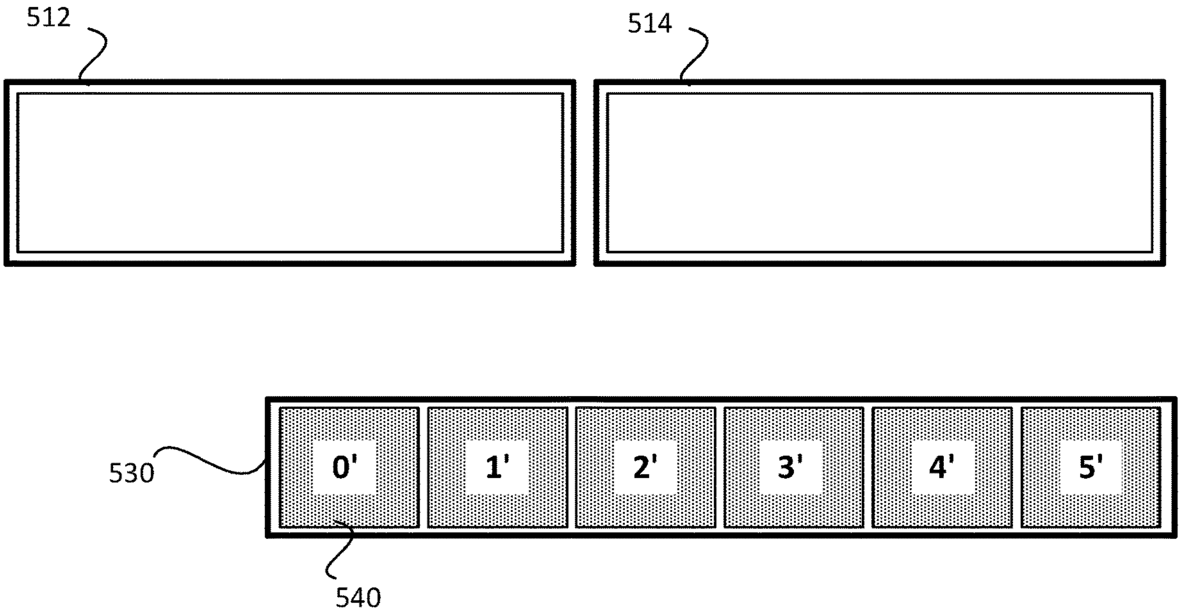

In each lane, a single data element may be operated on at a time, but a respective data element in each lane may be operated on at the same time. For example, FIG. 5B shows a first data element 0 of lane 514, and a first data element 1 of lane 512, being operated on, and respective operation results 0' and 1' being stored in memory 530. FIG. 5C shows a second data element 2 of lane 514, and a second data element 3 of lane 512, being operated on, and respective operation results 2' and 3' being stored in the memory 530. FIG. 5D shows a third data element 4 of lane 514, and a third data element 5 of lane 512, being operated on, and respective operation results 4' and 5' being stored in the memory 530. Operations may be carried out on the individual data elements of a given lane one at a time using a mask-and-shift technique, whereby the operation is carried out on only a single data element of each lane per mask and shift operation.

At block 460, a result of the SIMD instructions is output into the memory for storage. As shown in FIGS. 5B-5D, data elements 520 may be moved from the vector register lanes 512, 514 to a memory 530 after processing in a streaming manner. Storage operations for the data elements 520 may follow the predetermined lane order, such that the processed data elements are stored in their original order. FIG. 5D shows a stored result of the SIMD instructions, as stored in memory 530. The data processed data elements 0', 1', 2', 3', 4' and 5', are ordered in the same order that they were first loaded into the SIMD unit. This order may be same as the order of the data elements in their original form, for instance as data elements within a columnar-store DBMS. Maintaining the order of the data elements enables fast decoding.

In the case of performing filter operations, SIMD compare instructions may be performed to identify certain bits, and a movemask instruction may be performed to gather to the identified bits into a compact bit vector. A lookup table may be utilized in order to reorder the bits into a desired result, such as a bit vector, a Boolean array, or a different output type.

The element-by-element approach to SIMD operations, as compared to a bit-by-bit approach, achieves full-value decoding and thus allows for follow-on SIMD operations or instructions to be performed without complex decoding techniques having to be performed. Stated another way, the routine 400 provides the benefit of loading multiple data elements into a vector register lane to take full advantage of SIMD, while also not losing track of the separate data elements so that full-value decoding can still be performed.

The routine 400 has advantages over standard approaches for comparing densely packed numeric values, since such values normally cannot be processed using a SIMD unit and instead must be evaluated using a scalar register, leaving the register largely underutilized. The routine 400 overcomes this challenge thanks to the correlation of certain data element sizes with corresponding lane configurations, ensuring that values loaded into vector registers does not leave the registers underutilized. Ultimately, the routine has been found to deliver 16× comparison speed and 7× decoding speed as compared to the standard approaches.

The routine 400 also has advantages over other approaches for processing bit-packed values using SIMD that require shuffling and bit-duplication techniques in order to align the bit-packed values with the physical storage boundaries. Such techniques require additional processing, which can add significant time and costs. Furthermore, those techniques typically do not involve full-value decoding, and thus do not support follow-on SIMD operations or instructions to be performed in a straightforward manner, such as without complex decoding techniques. Additionally, those techniques generally do not improve both decoding speed and storage size, as is achieved by the present routine 400.

The above examples generally describe outputting a result having the same width as the chosen configured lane size of the SIMD unit. However, the underlying principles of the present disclosure may similarly be applied to match any lane configuration with any desired amount of bits, since mask-and-shift operations can easily facilitate reordering the result to the desired size for storage in the memory.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for processing a bit-packed array, comprising:

determining, by one or more processors, a data element size of the bit-packed array;

determining, by the one or more processors, a lane configuration of a single-instruction multiple-data (SIMD) unit for processing the bit-packed array based at least in part on the determined data element size, wherein the lane configuration is determined from among a plurality of candidate lane configurations, each candidate lane configuration having a different number of vector register lanes and a corresponding bit capacity per vector register lane;

configuring, by one or more processors, the SIMD unit according to the determined lane configuration; and loading, by one or more processors, one or more data elements into each vector register lane of the SIMD unit, wherein the lane configuration of the SIMD unit is determined according to a lookup table correlating a plurality of different data element sizes with corresponding lane configurations.

2. The method of claim 1, wherein the plurality of candidate lane configurations includes a 16-bit lane width, a 32-bit lane width, a 64-bit lane width, and a 128-bit lane width.

3. The method of claim 1, wherein executing a SIMD instruction comprises executing an instruction of an AVX, AVX2, AVX-512, SSE, or ARM Neon instruction set.

4. A method for processing a bit-packed array, comprising:

determining, by one or more processors, a data element size of the bit-packed array;

determining, by the one or more processors, a lane configuration of a single-instruction multiple-data (SIMD) unit for processing the bit-packed array based at least in part on the determined data element size, wherein the lane configuration is determined from among a plurality of candidate lane configurations, each candidate lane configuration having a different number of vector register lanes and a corresponding bit capacity per vector register lane;

configuring, by one or more processors, the SIMD unit according to the determined lane configuration; and loading, by one or more processors, one or more data elements into each vector register lane of the SIMD unit, wherein loading one or more data elements into each vector register lane is repeated until the determined data element size exceeds a remaining space of each vector register lane.

5. The method of claim 4, wherein loading one or more data elements into each vector register lane comprises loading the data elements into each vector register lane in an interleaving pattern according to a predetermined lane order.

6. The method of claim 5, further comprising:

executing, by one or more processors, a SIMD instruction on the loaded one or more data elements of each vector register lane in parallel; and storing, by one or more processors, a result of the SIMD instruction in memory.

7. The method of claim 6, wherein executing a SIMD instruction on a loaded data element of each vector register lane in parallel comprises performing one or more mask and shift operations, whereby the SIMD instruction is executed on only a single data element of each vector register lane in parallel per mask and shift operation.

8. The method of claim 7, wherein a result of the SIMD instruction on the bit-packed array is stored in an order corresponding to the predetermined lane order.

9. The method of claim 6, wherein executing a SIMD instruction comprises executing at least one of: (a) one or more compare/decode instructions or (b) one or more filter instructions.

10. The method of claim 4, wherein executing a SIMD instruction comprises executing an instruction of an AVX, AVX2, AVX-512, SSE, or ARM Neon instruction set.

11. A system for processing a bit-packed array, comprising:

memory for storing instructions;

one or more processors coupled to the memory and configured to execute the stored instructions to:

determine a data element size of the bit-packed array;

determine a lane configuration of a single-instruction multiple-data (SIMD) unit for processing the bit-packed array based at least in part on the determined data element size, wherein the lane configuration is determined from among a plurality of candidate lane configurations, each candidate lane configuration having a different number of vector register lanes and a corresponding bit capacity per vector register lane;

configure the SIMD unit according to the determined lane configuration; and load one or more data elements into each vector register lane of the SIMD unit, wherein the one or more processors are configured to determine the lane configuration of the SIMD unit according to a lookup table correlating a plurality of different data element sizes with corresponding lane configurations.

12. The system of claim 11, wherein the plurality of candidate lane configurations includes a 16-bit lane width, a 32-bit lane width, a 64-bit lane width, and a 128-bit lane width.

13. The system of claim 11, wherein the SIMD instruction is an instruction of an AVX, AVX2, AVX-512, SSE, or ARM Neon instruction set.

14. A system for processing a bit-packed array, comprising:

memory for storing instructions;

one or more processors coupled to the memory and configured to execute the stored instructions to:

determine a data element size of the bit-packed array;

determine a lane configuration of a single-instruction multiple-data (SIMD) unit for processing the bit-packed array based at least in part on the determined data element size, wherein the lane configuration is determined from among a plurality of candidate lane configurations, each candidate lane configuration having a different number of vector register lanes and a corresponding bit capacity per vector register lane;

configure the SIMD unit according to the determined lane configuration; and load one or more data elements into each vector register lane of the SIMD unit, wherein the one or more processors are configured to repeatedly load one or more data elements into each vector register lane until the determined data element size exceeds a remaining space of each vector register lane.

15. The system of claim 14, wherein the one or more processors are configured to load the data elements into each vector register lane in an interleaving pattern according to a predetermined lane order.

16. The system of claim 15, wherein the one or more processors are configured to:

execute a SIMD instruction on the loaded one or more data elements of each vector register lane in parallel; and store a result of the SIMD instruction in memory.

17. The system of claim 16, wherein the one or more processors are configured to perform one or more mask and shift operations, whereby the SIMD instruction is executed on only a single data element of each vector register lane in parallel per mask and shift operation.

18. The system of claim 17, wherein the one or more processors are configured to store a result of the SIMD instruction on the bit-packed array in an order corresponding to the predetermined lane order.

19. The system of claim 16, wherein the SIMD instruction is at least one of: (a) one or more compare/decode instructions or (b) one or more filter instructions.

20. The system of claim 14, wherein the SIMD instruction is an instruction of an AVX, AVX2, AVX-512, SSE, or ARM Neon instruction set.

* * * * *